UNITED STATES PATENT OFFICE.

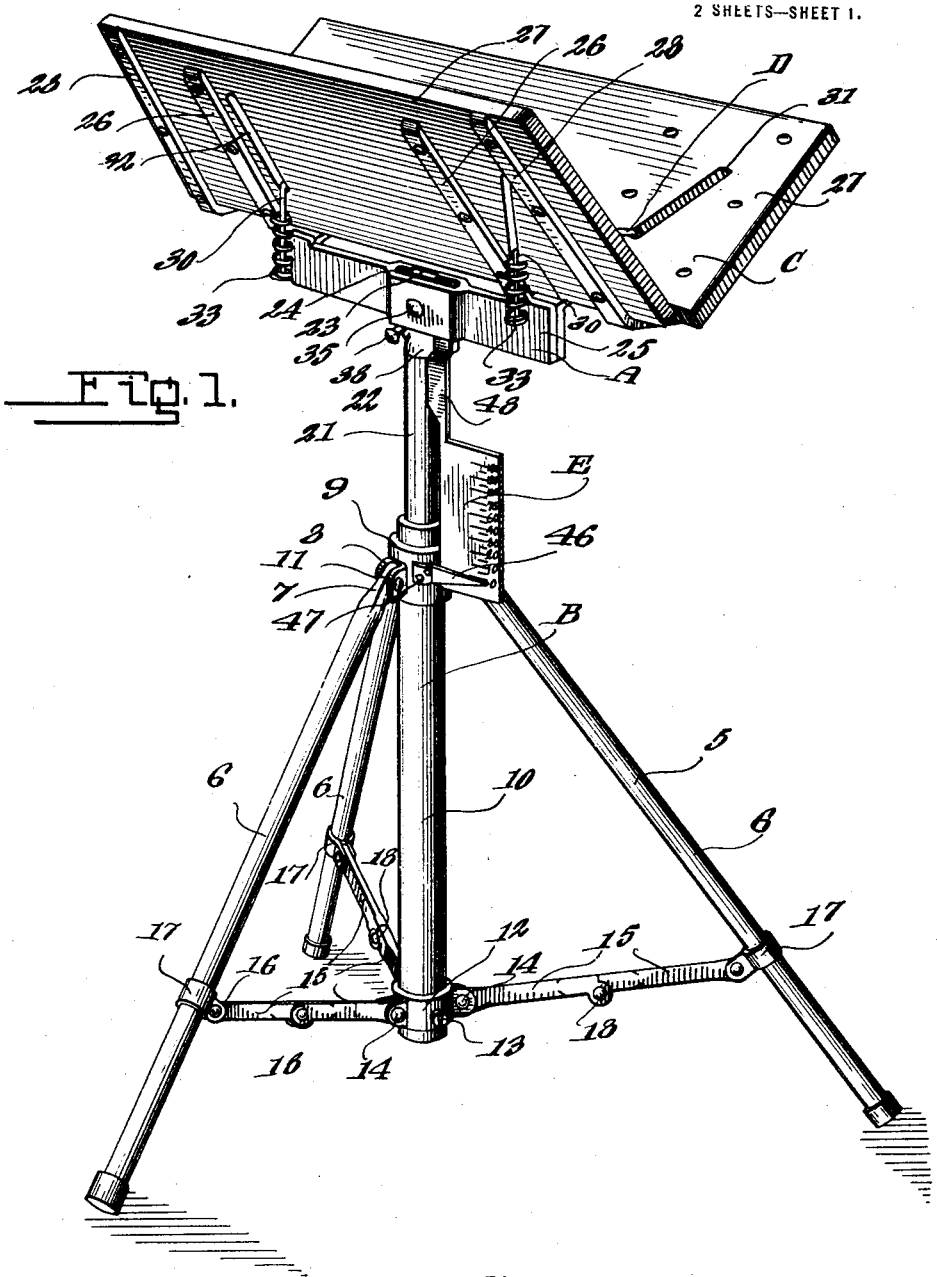

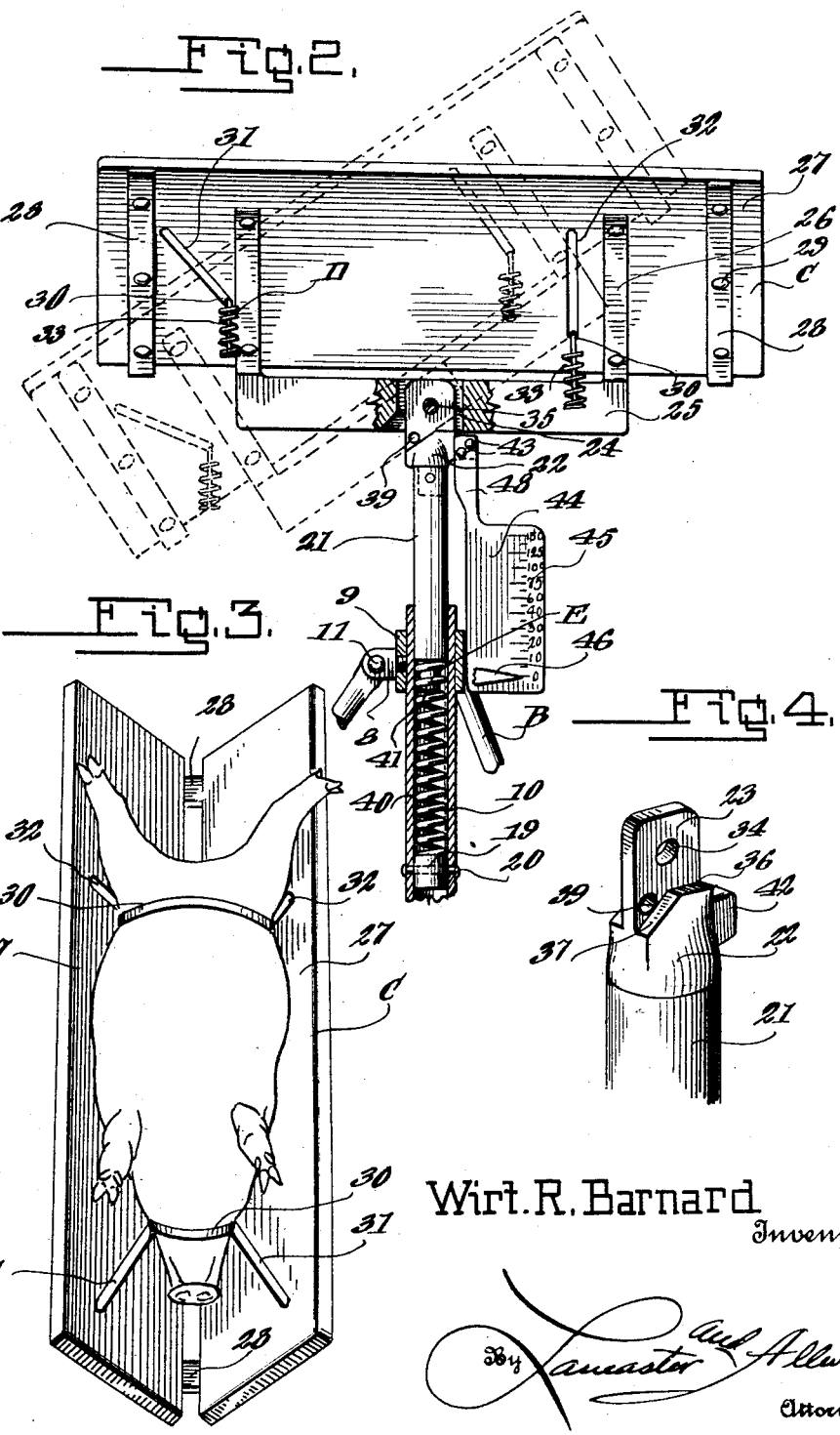

WIRT R. BARNARD, OF BELLEVILLE, KANSAS.

COMBINED ANIMAL OPERATING TABLE AND SCALE.

1,404,173.  Specification of Letters Patent.  Patented Jan. 17, 1922.

Application filed January 8, 1920. Serial No. 350,198.

*To all whom it may concern:*

Be it known that I, WIRT R. BARNARD, a citizen of the United States, residing at Belleville, in the county of Republic and State of Kansas, have invented certain new and useful Improvements in Combined Animal Operating Tables and Scales, of which the following is a specification.

This invention relates to veterinary operating tables, and the primary object of the invention is to provide an improved operating table for small animals, such as dogs, cats, pigs, and the like, which is so constructed as to permit the easy placing of the animals in position thereon and prevent movement of the animals after being placed in position.

Another object of the invention is the provision of an improved device for facilitating the injection of serum such as anti-cholera serum in hogs. In the injection of serum into hogs, a certain amount of the drug is injected into the animals according to their weight and in the method now employed, the veterinary surgeon generally guesses the weight of the animals which often results in too little or too much serum being injected into the animal, thereby preventing the best results from being obtained from the injection.

It is therefore, another object of the invention to provide an improved table for hogs and the like having a scale associated therewith so that the exact weight of the animals can be readily and quickly determined.

A further object of the invention is the provision of an improved operating table for small animals which can be positioned in a horizontal plane or at an angle to the horizontal thereby facilitating the treatment and operation of certain parts of the animal.

A still further object of the invention is to provide an improved operating table for small animals which can be readily and quickly taken apart or set up, and which will occupy a very small space when in its knocked down position, thereby facilitating the transportation and storing of the same.

A still further object of the invention is to provide an improved device of the above character, which is durable and efficient in use, one that is simple and easy to manufacture, and one which can be placed upon the market at a reasonable cost.

Other objects of the invention will appear in the following detailed description, taken in connection with the drawings, forming a part of this specification, and in which drawings:

Figure 1 is a perspective view of the improved operating table.

Figure 2 is an enlarged fragmentary side elevation of the same, showing parts of the table in section.

Figure 3 is a plan view of the animal receiving trough, and

Figure 4 is an enlarged detail perspective view of the upper end of the table supporting standard.

Referring to the drawings, in detail, wherein similar reference characters designate corresponding parts throughout the several views, the letter A indicates the improved operating table, which includes the support B, the animal receiving trough C having the holding means D associated therewith, and the weighing mechanism E.

The support B includes the tripod base 5 having the upper terminals of the legs 6 thereof flattened as at 7 and positioned in brackets 8 carried by the collar 9 secured to the upper end of the central supporting standard 10. The legs 6 are pivotally secured to the brackets 8 by suitable pivot pins 11.

The lower end of the central supporting standard 10 is provided with a collar 12, which is adjustably mounted on the standard and held in adjusted position by a set screw 13 which is adapted to bite into the standard. The collar 12 carries a plurality of outstanding spaced brackets 14 which pivotally support the inner terminals of the pivoted link sections 15, which have their outer ends pivotally secured as at 16 to collars 17 carried by the legs. The collars 17 are adjustable on the legs and held in their adjusted positions by frictional contact with the legs. If so desired, set screws may be provided for biting into the legs 6. The inner terminals of the link sections 15 are pivotally connected together, as at 18 and form a knuckle joint. The central supporting standard 10 is of hollow formation and is provided intermediate its ends with an interior cylindrical stop 19, which is riveted or otherwise secured in position against accidental displacement as at 20. The upper end of the hollow standard 10 slidably supports the solid rod 21 having the head 22 formed thereon, which pivotally supports the animal trough C. The head 22 is provided with an upwardly extending centrally disposed reduced lug 23, which is adapted to be positioned in the slot 24 of the supporting bracket 25 for the trough C. The supporting bracket 25 is enlarged intermediate its ends so as to prevent weakening of the same by the opening 24 and the outer ends of the bracket 25 are provided with upwardly and outwardly extending oppositely inclined arms 26. The supporting trough C includes a pair of angular related side plates 27 which are held in their correct position by strap irons 28, which are arranged adjacent to the terminals of the boards or side plates 27 and are secured to the same by suitable fastening elements 29.

The trough C is positioned between the arms 26 carried by the supporting bracket 25 and the arms 26 are secured to the same by suitable removable fastening elements. The animal holding means D for the trough C include a pair of flexible straps located adjacent to the terminals of the side plates, and these straps extend through aligned slots 31 and 32 formed in the side plates. The slots 31 which are located adjacent to the forward end of the plate are inclined downwardly and inwardly and the strap 30 which is slidably mounted therein is adapted to engage the animal's muzzle. The lower terminals of each one of the straps 30 are secured to springs 33, which are coiled around the frame, and these springs normally tend to hold the straps 30 adjacent to the lower end of the slots. The springs permit the straps to be lifted so as to accommodate animals of different sizes.

The central portion of the upwardly extending stud 23 is provided with an opening 34 which is adapted to register with openings formed in the side walls of the opening 24, and the registered openings receive a pivot pin 35 which permits the trough C to be swung at an incline to the horizontal. The upwardly extending stud 23 defines in connection with the head 22 horizontally disposed shoulders 36, on which are adapted to rest the lower surface of the brackets 25, when the same is in its horizontal position. The forward ends of the shoulders 36 are bevelled downwardly as at 37, and the bevelled portions of the shoulders form stops for limiting the downward movement of the brackets 25 when the trough C is swung at an angle to the horizontal. A removable pin 38 is adapted to be positioned in an opening 39 formed in the upstanding stud 23 and this pin is adapted to engage the lower surface of the bracket to prevent the same from swinging on its pivot 35, when the trough is arranged in a horizontal position.

The weighing mechanism E includes a compression coil spring 40, which is positioned in the hollow central supporting standard 10 intermediate the stop 19 and the lower end of the rod 21, which has its lower end reduced as at 41 for fitting in the upper end of the spring. The head 22 carries a rearwardly projecting stud 42, which has bolted or otherwise secured thereto as at 43, the dial plate 44, which is provided with suitable graduations 45. A pointer 46 is secured as at 47 to the collar 9 and is adapted to cooperate with the graduations on the dial plate 44 so that the correct reading may be obtained. The upper rear end of the dial plate 44 is provided with the upwardly extending reduced shank 48, which provides means whereby the dial plate can readily be secured to the stud 42.

In operation of the improved device, the animal is laid in the trough C and securely strapped therein by means of the straps 30 as clearly shown in Figure 3 of the drawings, and as will be seen, one of the straps engage the animal's muzzle while the other engages around the animal's body adjacent to the rear end thereof. The correct weight can be readily seen by the position of the dial plate in relation to the pointer 46 and the amount of serum to be injected into the animal can be readily determined. When it is desired to operate on the animals, the trough can be moved at an incline to the horizontal by removing the pin 38 and allowing the bracket to swing on its pivot and ride into engagement with the shoulders 37.

The height of the trough can be readily adjusted by moving the collar 12 up or down on the standard 10 and the collars 17 on the legs 6.

From the foregoing description, it can be seen that an improved operating table is provided for hogs or other small animals, which is of exceptionally simple and durable construction, and which will effectively hold the hog or other animal against movement while being operated on and give the correct weight of the animal.

Changes in details may be made without departing from the spirit or scope of my invention; but,

I claim:

1. In an animal operating table, a trough including angular related side walls having aligned slots formed therein, a flexible retaining member arranged transversely of the trough and extending through said slots, and spring means normally holding the retaining member at the lower ends of the slots.

2. In an animal operating table, a trough including angular related side walls, the forward terminal of the walls having aligned inclined slots formed therein, the rear portions of the walls having aligned vertical slots formed therein, flexible retaining members extending across the trough and arranged in said slots, and coil springs arranged to normally hold the adjustable retaining elements in the lower ends of the slots.

3. An animal operating table including a supporting base, a rod carried by the base, a head arranged on the rod, an upwardly extending reduced stud formed on the head, the stud forming in connection with the head abrupt shoulders, the forward end of the shoulders being inclined downwardly, and a bracket pivotally secured to the stud and arranged to engage the shoulder, a removable pin carried by the stud arranged to engage the lower surface of the bracket to hold the same in a horizontal position, the bracket being adapted to engage the inclined portion of the shoulders upon removal of the pin, and a trough carried by said bracket.

4. An animal operating table comprising a supporting base including a hollow standard, a rod slidably mounted within the standard, a compression spring arranged in the standard for supporting said rod, a head formed on the upper end of the rod including a pivot lug, a bracket pivotally secured to the lug, means for holding the bracket in adjusted position on the head, a V-shaped trough carried by the bracket, a pointer carried by the standard, and a scale plate carried by the head and arranged to be moved past said pointer.

5. An animal operating table comprising a supporting base including a hollow standard, a stop plug arranged in the standard, a rod slidably mounted in the hollow standard having a reduced inner terminal, a compression spring arranged in the standard and supported by said stop plug and receiving the inner end of the rod, a head carried by the upper end of said rod, and a longitudinally extending base plate pivoted to said head, means for holding the base plate in adjusted position on said head, a V-shaped trough carried by the base plate, animal retaining means carried by the trough, a pointer secured to the standard, an outwardly extending lug carried by the head, and a depending scale arm secured to the lug and arranged to be moved past said pointer upon the depression of said rod in said standard.

WIRT R. BARNARD.